United States Patent [19]

Tordjman

[11] 4,367,252

[45] Jan. 4, 1983

[54] ARRANGEMENTS FOR THE DRY TRANSFER OF CHARACTERS COMPOSED OF INK

[75] Inventor: Roger A. Tordjman, La Celle-St-Cloud, France

[73] Assignee: Mecanorma S.A., Paris, France

[21] Appl. No.: 172,406

[22] Filed: Jul. 25, 1980

Related U.S. Application Data

[63] Continuation-in-part of Ser. No. 94,819, Nov. 16, 1979, abandoned, which is a continuation of Ser. No. 896,147, Apr. 13, 1978, abandoned.

[30] Foreign Application Priority Data

Nov. 30, 1977 [FR] France ............................... 77 36090

[51] Int. Cl.³ ........................ B65D 65/28; B32B 3/02; B32B 3/10

[52] U.S. Cl. ........................................ 428/41; 428/43; 428/45; 428/46; 428/914; 428/203; 428/352; 156/234; 156/240; 156/257; 156/277; 156/247

[58] Field of Search .................. 428/41, 43, 136, 138, 428/194, 198, 202, 914, 45, 79, 46, 134, 47, 204, 76, 203, 352, 353; 156/108, 247, 240, 277, 257, 268, 234, 247; 101/35

[56] References Cited

U.S. PATENT DOCUMENTS 747,861 12/1903 Deckert .............................. 428/914
2,363,472 11/1944 Ritter .................................... 428/43
3,297,508 1/1967 Jahp ...................................... 428/43
3,741,787 6/1973 Tordjman .......................... 156/234
3,930,092 12/1975 Shapiro ............................. 156/240
3,985,602 11/1976 Stuart ................................ 156/240

FOREIGN PATENT DOCUMENTS 2407085 6/1977 France ............................... 428/914

*Primary Examiner*—Edward C. Kimlin
*Assistant Examiner*—Louis Falasco
*Attorney, Agent, or Firm*—Staas & Halsey

[57] ABSTRACT

This invention relates to arrangements for the dry transfer of printed characters. Such arrangements hitherto have comprised a carrier sheet of which one face is provided with printed characters which are transferable to a receiving surface by pressure exerted on the carrier sheet. The characters are protected by a sheet of siliconized paper. However, such an arrangement is not always easy to handle because the siliconized sheet can become creased or crumpled, damaging the characters.

According to the invention, the entire area of at least one of the faces of said carrier sheet is covered with a guard sheet which is attached to said carrier sheet along at least a part of its periphery, and which is provided with preformed cuts to define a frame fastened to said carrier sheet and a central portion which is intended to be removed when the arrangement is put to use.

10 Claims, 6 Drawing Figures

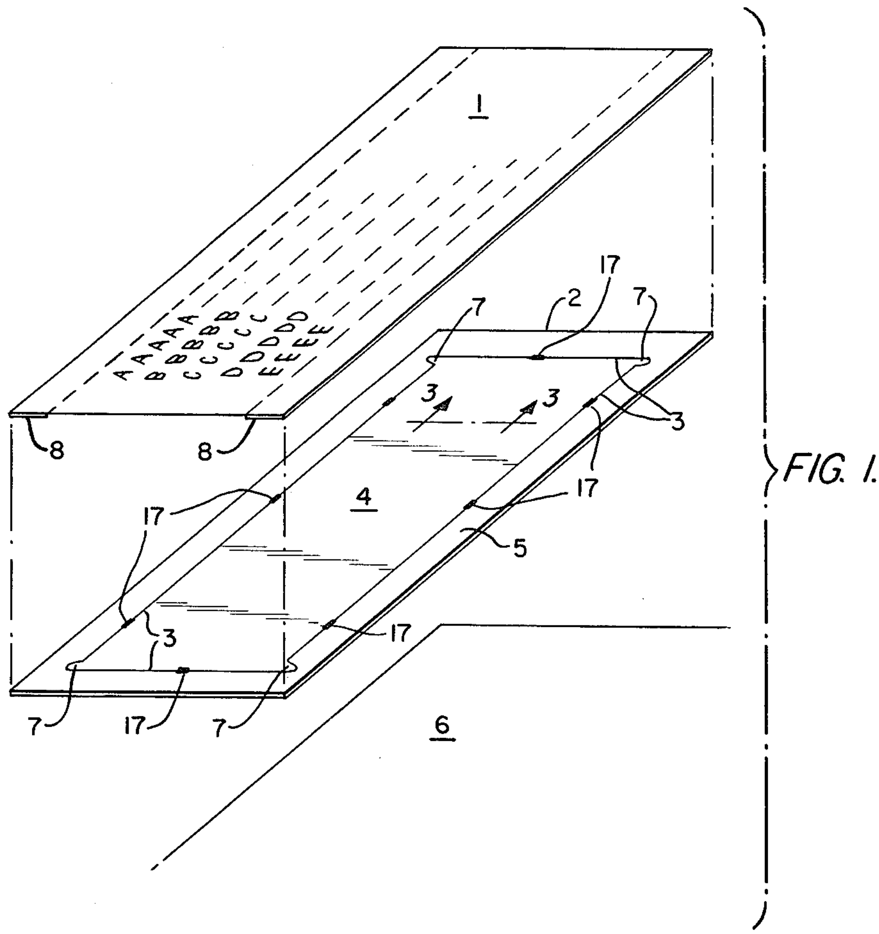
FIG. 1.
FIG. 2.
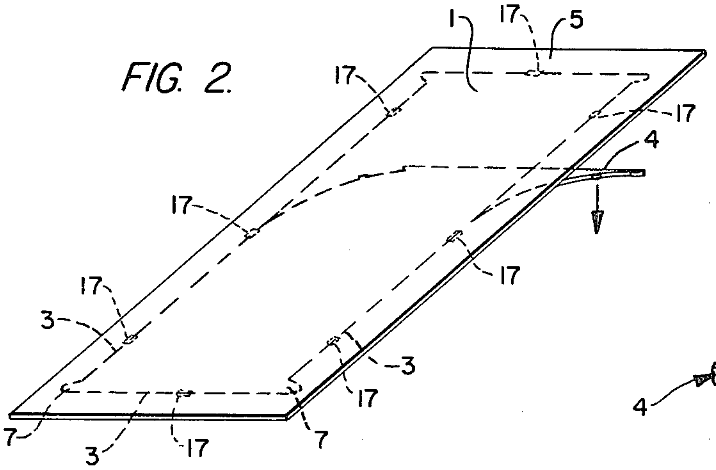
FIG. 3.
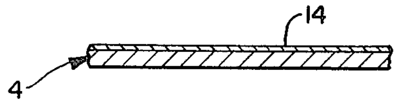

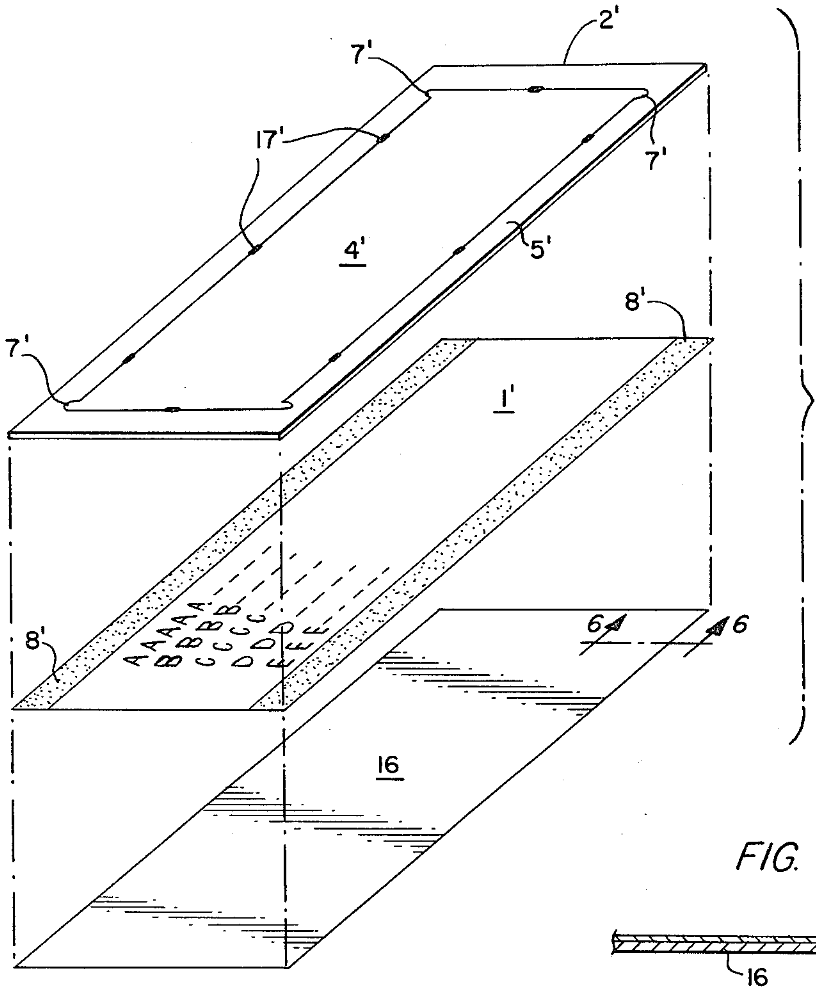
FIG. 4.
FIG. 6.
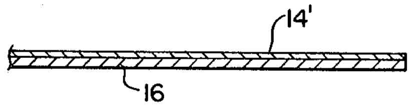
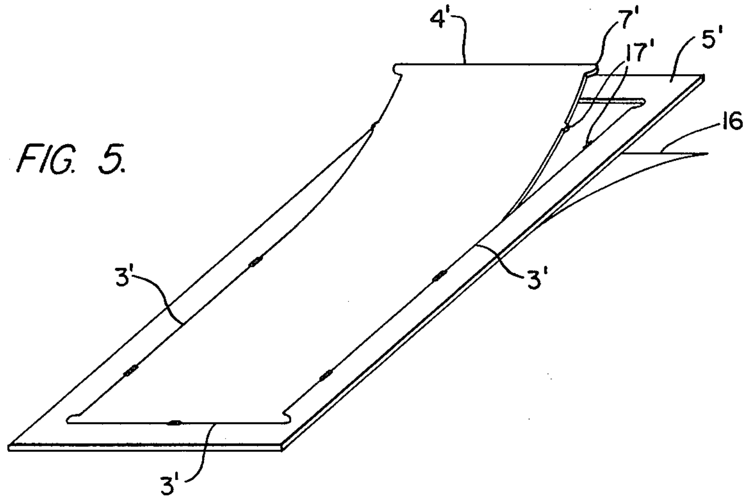
FIG. 5.

ARRANGEMENTS FOR THE DRY TRANSFER OF CHARACTERS COMPOSED OF INK

CROSS REFERENCE TO RELATED APPLICATIONS

This is a continuation-in-part of application Ser. No. 94,819 filed Nov. 16, 1979 abandoned, which is a continuation of application Ser. No. 896,147 filed Apr. 13, 1978 abandoned.

BACKGROUND OF THE INVENTION

The present invention relates to arrangements for the dry transfer of characters composed of ink.

Conventionally, in such dry transfer arrangements the carrier sheet is provided with characters composed of ink which are intended to be transferred, and is protected by means of a sheet of siliconized paper. Such arrangements are disclosed in U.S. Pat. No. 3,741,787 by the same inventor as subject invention. The combination formed by the carrier sheet and the siliconized sheet can easily be folded or crumpled however and this results in damage to the characters, which may crack and/or become partly detached from the carrier sheet.

In addition, when the siliconized protective sheet is removed, the carrier sheet is not always easy to handle, particularly when it is desired to position letters properly to form words which need to be aligned.

It is an object of the present invention to provide an arrangement which will overcome or minimize the various disadvantages hereinabove referred to, and make it possible both to have a carrier sheet which is satisfactorily protected before the arrangement is used, and for the characters to be transferred very conveniently and with complete safety, and for the carrier sheet to be kept flat with no risk of undesirable folding.

Known prior art patents are the patent to Ritter U.S. Pat. Nos. 2,363,472 and the patent to Jahp 3,297,508.

The Ritter patent discloses a mailing card permitting the sending of a decalcomania transfer device. The decalcomania device comprises a sheet 11 which is bonded by two edges 14 to a mailing card 10. In order to use the decalcomania a prior severing of perforated line 16 in order to detach the decalcomania is required. This is in contrast to the present invention wherein the carrier sheet remains attached to the peripheral part of the guard sheet while the transfer is being performed. In fact, the carrier sheet always remains attached to the peripheral part for strength and protection.

The Jahp patent does not have a plurality of characters provided on the carrier sheet as in the present invention. Furthermore, in the present invention, the transfer of the characters to a desired support does not destroy the carrier sheet. That is, after the transfer of any or all of the characters of the present invention, the carrier sheet still remains supported and protected by the peripheral part of the guard sheet. This feature is very important for providing a carrier sheet which is properly maintained and protected by the guard sheet, and also to permit and allow a good transfer of the characters from the carrier sheet. The Jahp patent does not show such a combination of a guard sheet with a carrier sheet, and the present invention is an important improvement thereover.

SUMMARY OF THE INVENTION

To achieve the above and other objects, the best mode of the invention consists in an arrangement for the dry transfer of printed characters, of the kind comprising a carrier sheet of which one face is provided with printed characters which are transferable to a receiving surface by pressure exerted on the carrier sheet, wherein the entire area of at least one of the faces of the sheet is covered with a guard sheet which is attached to the carrier sheet along at least a part of its periphery, and which is provided with preformed cuts which define a frame fastened to the carrier sheet and a central portion which is intended to be removed when the arrangement is put to use.

By virtue of the pre-cutting, the guard sheet so precut will be able to perform both the conventional function of the protective sheet, as long as the central portion has not been removed, and also that of a frame, once the central portion has been removed, this frame making the characters considerably easier to use.

The present invention also comprises a method of making the arrangement.

BRIEF DESCRIPTION OF THE DRAWINGS

In order that the invention may be more clearly understood, reference will not be made to the accompanying drawings which show several embodiments by way of example and in which:

FIG. 1 is a perspective view of a first embodiment of an arrangement according to the invention;

FIG. 2 is a diagrammatic view of this arrangement with the central portion of the pre-cut sheet being removed;

FIG. 3 is a partial cross section taken across lines 3—3 of FIG. 1;

FIG. 4 is a perspective view of another embodiment of the present invention;

FIG. 5 is a diagrammatic view of this arrangement of FIG. 4 with the central portion of the pre-cut sheet being removed; and FIG. 6 is a partial cross sectional view taken along lines 6—6 of FIG. 4.

DETAILED DESCRIPTION OF THE PREFERRED EMBODIMENT

Referring now to the drawings, the arrangement shown in FIG. 1 comprises a carrier sheet 1 of which one face is provided with printed characters, such as letters, figures or symbols. Against this printed face, over the whole of its area, is arranged a guard sheet 2 provided with preformed cuts 3 which define a central portion 4 and a surround or margin 5.

Materials for carrier sheet and transferable characters may be various and, for example, of the kind disclosed in the aforementioned U.S. Pat. No. 3,741,787 to Tordjman which is hereby incorporated by reference. Furthermore, the manner in which the carrier sheet is used for transferring a character can be the same as that disclosed in Column 5 of U.S. Pat. No. 3,741,787. As a matter of fact, the provision of a guard sheet as disclosed in the present Tordjman invention is advisable in the case of a carrier sheet constituted by any material which is subjected to folding or crumpling when not associated with a guard sheet, i.e., paper, plastic film or sheet, etc.

Regarding the kind of material used to produce the guard sheet, examples which may be mentioned are stiff paper, thin cardboard (cartridge paper, bristol board), or thin plastics material, all of which are suitable. It is clear that if this material is stiff, the surround or margin 5, which forms a frame when the central portion has been removed, will itself be stiff and will be the more so the stiffer the material.

By virtue of this provision, the carrier sheet 1 is properly protected.

This protection also allows the user to be sure that the overall arrangement has not been previously used. The user, to make use of the arrangement according to the present invention, and to transfer the selected character or characters to a receiving surface illustrated at 6, will begin by stripping out the central portion 4. Any suitable means such as an eyelet, not shown here, may be provided for this purpose. Prior to this operation, the central portion 4 remains integral with the surround or margin 5, for example, by means of connecting bridges 7, which are situated in the present case at the four corners of the central portion although the number and position of these bridges may vary. Thus, the connecting bridges may be situated in other positions than at the said corners and the pre-cutting may then produce points or projections 17 at these locations to enable the central portion to be fitted back into the margin frame when the user has temporarily completed the transfer of characters and wishes to protect the carrier sheet.

An adhesive may be used for transferring the characters, as disclosed in the U.S. Pat. No. 3,741,787.

Furthermore, to prevent any accidental transfer of characters to the removable central portion, that face of the central portion which is in contact with the printed face of the sheet 1 will preferably be treated with a non-stick substance, 14 in FIG. 3, the anti-adhesion effect advantageously being less great the weaker the adhesive used for the transfer of the characters.

It will be apparent from the foregoing that when the central portion 4 has been removed the surround or margin 5 forms a frame for the carrier sheet 1, which is at 8 attached to the said frame along at least a part of its periphery and which is held under tension by the frame. By virtue of this provision, on the one hand it will be easier to handle the arrangement, particularly when using rulers or set squares, against which one of the sides of the said frame may rest, and on the other hand the carrier sheet will be better protected.

In some cases, the guard sheet may be situated adjacent the printed face of the carrier sheet and when the central portion has been removed the frame obtained will be situated between the carrier sheet and the receiving surface. This is the case illustrated in FIGS. 1–3.

In other cases, the guard sheet may be situated adjacent the unprinted face of the carrier sheet and in this case when the arrangement is put to use, the printed face will be in direct contact with the receiving surface. When it is not being used in this way it is desirable for the printed face to be protected, for example, with siliconized paper.

This latter embodiment is illustrated in FIGS. 4–6. In this embodiment the same reference characters have been used for the elements corresponding to those of FIGS. 1–3, but 8' has been added thereafter. The aforementioned siliconized paper is indicated by reference numeral 16, and as shown in the cross sectional view of FIG. 6, and adhesion-inhibiting substance 14' may also be used with the siliconized paper 16. However, since the paper itself is basically adhesion-inhibiting, the layer 14' may or may not be used.

Normally, when the embodiment of FIGS. 4–6 are to be used, the protective paper 16 is removed, and then the frame holding the carrier sheet 1' can be placed upon a transfer receiving surface such as 6 at FIG. 1, for reception of the desired characters to be transferred thereto.

Concerning the non-stick or adhesion-inhibiting substance which eventually covers the portion of the guard sheet which is in contact with the printed face of the carrier sheet, it can be of all well known kind, and for example, constituted by a silicon composition the same as for the protective paper mentioned above. Such an arrangement is also disclosed in U.S. Pat. No. 3,741,787.

The two embodiments above described may also be combined and a guard sheet provided on either side of the said carrier sheet, which is thus sandwiched.

Furthermore, it should be noted that by virtue of the guard sheet, or card, it is no longer necessary to provide any additional packaging for the overall arrangement, which is of course an added advantage.

In a first step of a method for making the arrangements shown in FIGS. 1 and 4, the carrier sheet is provided with its printed characters, and possibly with adhesive if the ink of the characters is not itself adhesive. At the same time a guard sheet is prepared and is provided with cuts, by means of a die or the like.

One or more edges of the carrier sheet are provided with adhesive, such as the strips 8 in FIG. 1, and the carrier sheet is then placed against the guard sheet.

There are other possible ways of attaching the carrier sheet to the guard sheet such as: stapling, heat-sealing, sewing, interengaging portions, etc.

By way of example only, the present invention may comprise:

(a) carrier sheet matter: polystrene (b) anti-adhesive substance: silicone (c) adhesive substance: compound of polyvinylisobutyl polymers modified by hydrocarbon resins and/or pentacrythritol esters (d) ink for transferable characters: nitrocellulose ink modified by pentacrythritols The method also extends to cases where the guard sheet is provided with a plurality of patterns of preformed cuts, the carrier sheet positioned against the said material containing a plurality of sets of characters, a subsequent cutting operation enabling a plurality of arrangements according to the present invention to be obtained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

I claim:

1. In an arrangement for the dry decalcomania of printed characters of the kind comprising a carrier sheet of a transparent or translucent material which may be subjected to being folded or crumpled when by itself, said carrier sheet having a face which is provided with a plurality of printed characters composed of ink and which are transferable from the carrier sheet to a receiving surface by pressure exerted locally on the carrier sheet, said transfer operation leaving the carrier sheet undamaged, the improvement comprising the carrier sheet being in association with a guard sheet having on one hand a peripheral part at least a portion of which is definitively attached to the periphery of said carrier sheet in order to constitute a frame for the carrier sheet when used in a transfer operation, and on the other hand having a central part detachably connected to the peripheral part by pre-formed cuts, said central part being intended to be removed for putting in transfer use the arrangement, said peripheral and central parts covering the entire area of at least one of the faces of said carrier sheet before the transfer operation.

2. An arrangement according to claim 1, wherein said pre-cut guard sheet is situated adjacent the printed face of said carrier sheet.

3. An arrangement according to claim 2, wherein a second pre-cut guard sheet is situated adjacent the unprinted face of the carrier sheet.

4. An arrangement according to claim 1, wherein the pre-cut guard sheet is situated adjacent the unprinted face of the carrier sheet, and a protective sheet is provided adjacent the printed face of the carrier sheet.

5. An arrangement according to claim 1, wherein the preformed cuts leave at least one connecting bridge.

6. An arrangement according to claim 1, wherein said preformed cuts produce pointed projections which, after said central portion has been removed, enable it to be replaced by fitting it back into said frame.

7. An arrangement according to claim 1, wherein the face of said central portion in contact with the printed face of said carrier sheet is treated with an adhesion-inhibiting substance.

8. An arrangement according to claim 7, wherein said adhesion-inhibiting substance is less preventive of adhesion the weaker the adhesive used for transfer.

9. An arrangement according to claim 1, wherein said central portion is provided with means enabling said central portion to be stripped out.

10. A method of making the arrangement according to claim 1, which consists in printing one face of a carrier sheet and providing it with adhesive, providing one or more of the edges of said sheet with adhesive, and placing said carrier sheet against a pre-cut guard sheet, the at least one edge which has been made adhesive being arranged adjacent said pre-cut guard sheet.

* * * * *